UNITED STATES PATENT OFFICE.

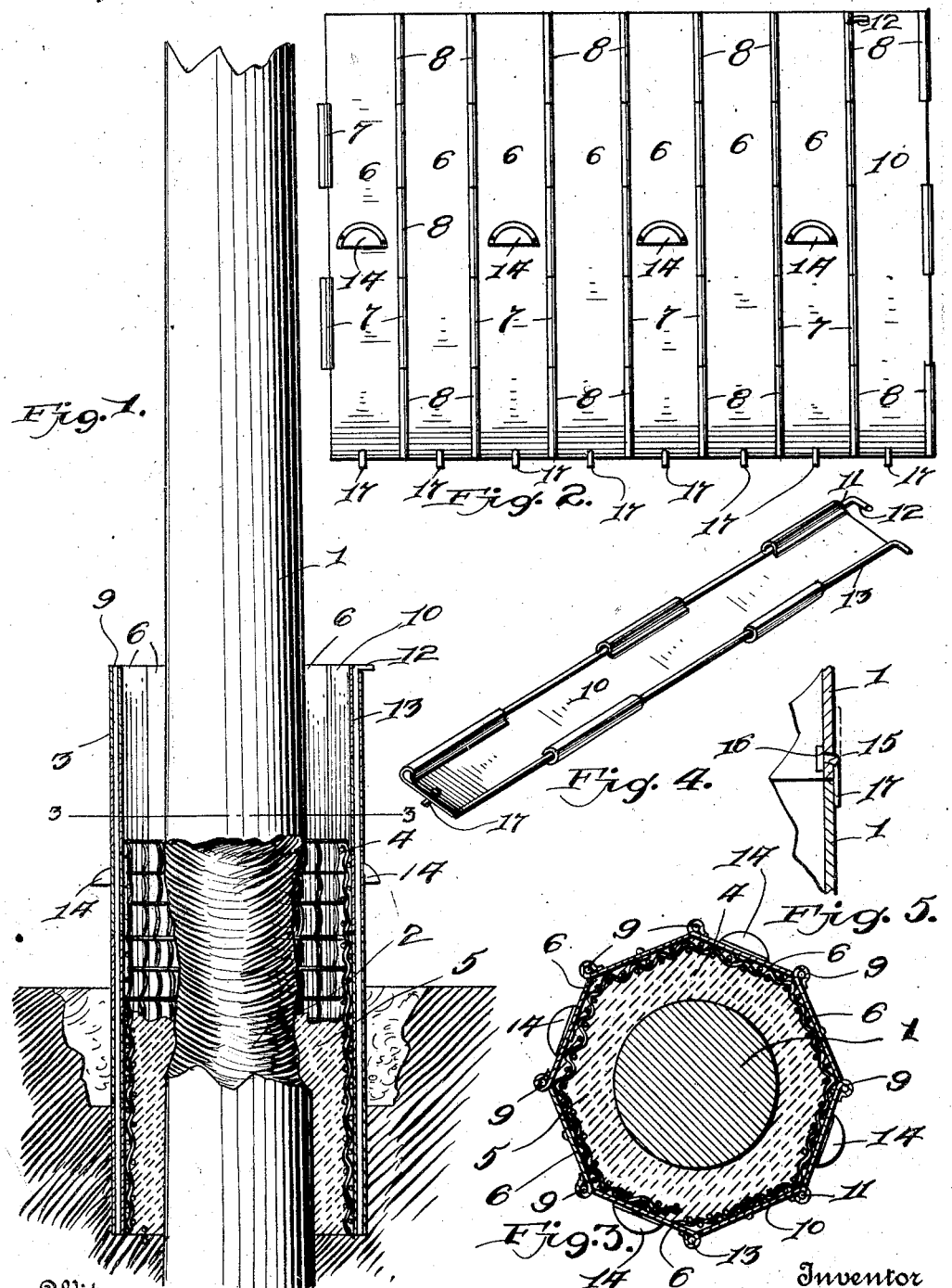

WILLIAM S. PROPER, OF ST. MARYS, WEST VIRGINIA.

PLASTIC MOLD.

968,798.  Specification of Letters Patent.  Patented Aug. 30, 1910.

Application filed December 2, 1909. Serial No. 530,969.

*To all whom it may concern:*

Be it known that I, WILLIAM S. PROPER, a citizen of the United States of America, residing at St. Marys, in the county of Pleasants and State of West Virginia, have invented certain new and useful Improvements in Plastic Molds, of which the following is a specification, reference being had therein to the accompanying drawing.

This invention relates to molds, and the principal object of the same is to provide a mold that may be used for applying a plastic reinforcement to portions of telegraph, telephone and electric poles, and the like, said mold being formed of a plurality of hinged sections, some of said sections having a detachable hinged connection with adjoining sections so that they may be removed when it is desired to reduce the size of the mold, said detachable sections being also provided with hinge ears by means of which they may be fastened to adjoining sections, or additional sections may be fastened thereto to increase the size of the mold.

In connection with the foregoing, it is contemplated providing the base of the mold sections with holding clips so that two or more molds may be stacked when necessary or desirable.

In carrying out the objects of the invention generally stated above, it will be understood, of course, that the essential features thereof are necessarily susceptible of changes in details and structural arrangements, one preferred and practical embodiment of which is shown in the accompanying drawings, wherein:—

Figure 1 is a fragmentary view in elevation of a post showing the base thereof surrounded by the improved mold, the mold being shown in section to expose the plastic material and the reinforcement therefor. Fig. 2 is a plan view of the mold shown opened. Fig. 3 is a horizontal sectional view taken on the line 3—3, Fig. 1. Fig. 4 is a detail perspective view of one of the sections of the mold. Fig. 5 is a fragmentary sectional view showing the manner of stacking two of the molds.

Referring to said drawings by numerals, 1 designates a post whose weakened base portion 2 is shown surrounded by the improved mold 3, reinforcing wire mesh 4 being shown therein in position to be embedded by the plastic material 5.

The mold is formed of a plurality of flat elongated sections 6, each section having outwardly projecting integral hinge ears at their longitudinal edges, said ears being designated by the numerals 7 and 8, respectively, and the ears at one edge being staggered relatively to the ears at the opposite edge, which arrangement of ears provides a continuous hinge opening at each edge when the sections are assembled so that two of said sections may be held in hinged engagement by a single hinge pin 9.

The hinge pins 9 are preferably straight so that the same may be readily forced from the hinge ears to permit a section to be removed when necessary, or to add a new section.

One outer section, 10 is held in engagement with an adjoining section by the pin 11 that has an angular head 12 which forms a handgrip by means of which said pin may be readily removed. Said section is also provided with another hinge pin 13 for its opposite edge, said pin 13 being a duplicate of pin 11 and adapted to hold the section 10 in detachable engagement with the other end section of the mold, thereby closing the mold. Section 10 and its hinge pins 11—13, is shown in detail in Fig. 4, and it will be obvious from the foregoing description when taken in connection therewith, that said section 10 may be omitted to decrease the size of the mold, or that other similar sections may be added to increase the size of the mold.

A handgrip 14 is provided upon the outer surface of some of the sections 6 so that handling of the mold may be facilitated.

The lower end of each section has a stacking clip 15 passed through the same from the inner surface, said clips having an enlarged head 16 that rests against the inner surface of the sections, and a pendent holding portion 17 that lies in contact with and projects below the lower edge of the sections. One of the clips is shown in detail in Fig. 5, and by reference thereto it will be seen that they are especially adapted for use on engaging over the upper edge of another mold to hold the molds in rigid stacked relation, the purpose of which is obvious. It will also be seen by reference to Fig. 1 that the holding clips 15 are also of material assistance in preventing slippage of the mold owing to the fact that they will engage the surface upon which the mold is resting.

It is preferred to strengthen a weakened post in the manner shown in Fig. 3, wherein the mold is placed around the post in spaced relation, and a reinforcement of wire mesh 4 placed within the mold so that when the plastic material 5 is placed within the mold, said reinforcement will be adjacent the outer surface thereof so that said outer surface will be held to the desired shape about the post, and that the outer surface will be greatly strengthened thereby. After, the plastic material has "set," the mold is removed by releasing the outer section 10.

It will be seen that by the use of the improved mold the plastic material is given an ornamental exterior appearance, and by the use of the wires, the same is reinforced.

What I claim as my invention is:—

A mold comprising a plurality of flat elongated sections, each having outwardly projecting hinge ears at its longitudinal edges, the ears at one edge being staggered relatively to the ears at the opposite edge so that two of the sections may be held hingedly together by a single pin, headed pins for detachably securing the sections together, hand grips arranged alternately on said sections, the lower ends of each section having a stacking pin inserted through the same, said pins being each provided with an enlarged head which contacts with the inner surface of said sections to retain the sections in place and also to prevent displacement of the mold.

In testimony whereof I hereunto affix my signature in presence of two witnesses.

WILLIAM S. PROPER.

Witnesses:
   GENEVRA VANDALE,
   JOE. WILLIAMS.